United States Patent [19]

Frederick

[11] Patent Number: 5,406,981
[45] Date of Patent: Apr. 18, 1995

[54] FLOW CONTROL FOR FLUID CIRCUITS

[76] Inventor: Charles V. Frederick, 2097 20th Ave., New Virginia, Iowa 50210

[21] Appl. No.: 225,817

[22] Filed: Apr. 11, 1994

[51] Int. Cl.6 .............................................. F16K 51/00
[52] U.S. Cl. ................................ 137/625.48; 137/872; 251/285; 180/6.3; 138/40
[58] Field of Search ................ 137/625.48, 625.5, 861, 137/883, 872; 180/6.3; 251/285; 138/40, 42, 43, 26

[56] References Cited

U.S. PATENT DOCUMENTS

| | | |
|---|---|---|
| 1,918,596 | 7/1933 | Gill . |
| 1,925,109 | 9/1933 | Olson . |
| 2,782,801 | 2/1957 | Ludwig ........................ 137/625.48 |
| 3,468,340 | 9/1969 | Camillo ........................ 137/625.48 |
| 4,081,231 | 3/1978 | Herrington .................... 137/872 X |
| 4,877,057 | 10/1989 | Christensen .................. 137/625.48 |
| 5,189,991 | 3/1993 | Humburg . |

FOREIGN PATENT DOCUMENTS 1291371 12/1962 France ........................... 137/625.48

Primary Examiner—Martin P. Schwadron
Assistant Examiner—Kevin L. Lee
Attorney, Agent, or Firm—Zarley, McKee, Thomte, Voorhees & Sease

[57] ABSTRACT

The flow control for fluid circuits having dual power outlets includes a housing having an interior compartment with the compartment having an interior surface, center portion and first and second ends. The compartment has a maximum cross-sectional area at its center portion uniformly decreasing in area towards the first and second ends. First and second outlet fluid ports are located in the housing adjacent the first and second ends. A pressure fluid inlet port is located in the housing at the center portion thereof. A flow control element is mounted for longitudinal movement in the interior compartment and has an outer surface symmetrical in shape to that of the compartment, but has a smaller diameter wherein a fluid flow space exists between the outer surface of the control element and the interior surface of the compartment. A control is provided for moving the control element longitudinally in the compartment to vary the size of the space between its exterior surface and the interior surface of the compartment at opposite sides of the center portion whereby the quantity of fluid flowing from the inlet port to the first and second outlet fluid ports can be simultaneously and proportionately increased and decreased respectively.

3 Claims, 1 Drawing Sheet

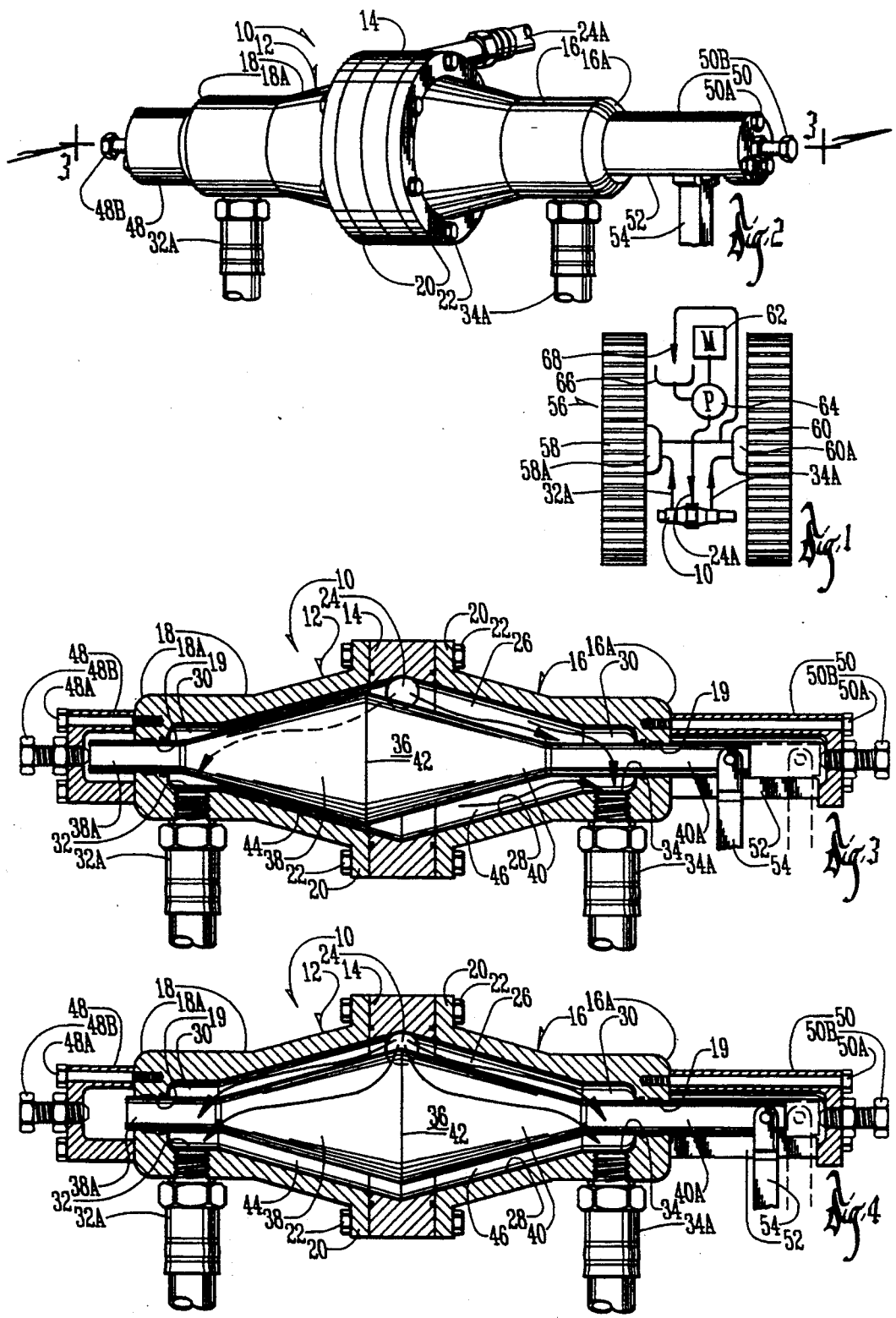

FLOW CONTROL FOR FLUID CIRCUITS

BACKGROUND OF THE INVENTION

Certain vehicles, such as skid loaders and crawler tractors, are driven by pressurized hydraulic circuits which deliver hydraulic fluid under pressure to hydraulic motors associated with the drive wheels on opposite sides of the vehicle. When the same amount of pressurized hydraulic fluid is supplied to each hydraulic motor, the vehicle travels in a straight line. As the supply of oil is increased on one side and decreased on the other, the vehicle is turned in one direction or another as the drive mechanism on one side of the vehicle travels at a different rate than on the other side of the vehicle.

A plurality of different valves and flow control devices have been adapted to divert the flow of oil to the opposite drive motors at opposite sides of such vehicles. However, these devices are characteristically expensive to manufacture and often make it difficult to smoothly and quickly control the vehicle.

It is therefore the principal object of this invention to provide a flow control for fluid circuits which is adaptable for use in supplying oil to hydraulic motors on the drive mechanisms at opposite sides of vehicles.

A further object of this invention is to provide a flow control for fluid circuits which is inexpensive to manufacture and easy to operate.

A still further object of this invention is to provide a fluid control for fluid circuits which will provide an infinite range of fluid flow for fluid circuits having dual power outlets.

It is a still further object of this invention to provide a flow control for fluid circuits having dual power outlets wherein the fluid flow is never stopped for either of the power outlets.

These and other objects will be apparent to those skilled in the art.

SUMMARY OF THE INVENTION

The flow control for fluid circuits having dual power outlets includes a housing having an interior compartment with the compartment having an interior surface, center portion and first and second ends. The compartment has a maximum cross-sectional area at its center portion uniformly decreasing in area towards the first and second ends. First and second outlet fluid ports are located in the housing adjacent the first and second ends.

A pressure fluid inlet port is located in the housing at the center portion thereof. A flow control element is mounted for longitudinal movement in the interior compartment and has an outer surface symmetrical in shape to that of the compartment, but has a smaller diameter wherein a fluid flow space exists between the outer surface of the control element and the interior surface of the compartment.

A control is provided for moving the control element longitudinally in the compartment to vary the size of the space between its exterior surface and the interior surface of the compartment at opposite sides of the center portion whereby the quantity of fluid flowing from the inlet port to the first and second outlet fluid ports can be simultaneously and proportionately increased and decreased respectively.

BRIEF DESCRIPTION OF THE DRAWINGS

FIG. 1 is a schematic plan view of a crawler tractor adaptable for use with the flow control device of this invention;

FIG. 2 is an enlarged scale perspective view of the flow control device of this invention;

FIG. 3 is a longitudinal sectional view of the device shown in FIG. 2 showing the position of the control element where oil flow is unequally directed to two dual power outlets; and FIG. 4 is a sectional view similar to that of FIG. 3 but shows the position of the control element when the vehicle is traveling in a straight direction.

DESCRIPTION OF THE PREFERRED EMBODIMENT

The numeral 10 designates the flow control device of this invention which has a housing 12. Housing 12 is comprised of center ring 14 and right and left-hand housing parts 16 and 18, respectively. Housing part 16 has an end 16A, and housing part 18 has an outer end 18A. Each of the ends 16A and 18A have center bores 19 which are longitudinally aligned. Also, the housing parts 16 and 18 have outwardly extending center flanges 20 which are secured to opposite sides of center ring 14 by means of conventional nut and bolt assemblies 22.

Pressurized fluid inlet port 24 extends into and through center ring 14 and is connected to fluid hose 24A. Inlet port 24 communicates with the compartment 26 within housing 12. The compartment 26 has an interior surface which has its largest diameter at the center thereof. The diameter of the interior surface 28 uniformly decreases towards cylindrical portions 30 of constant diameter at the ends 16A and 18A of housing parts 16 and 18, respectively.

A first fluid outlet port 32 is mounted in end 18A of housing part 18 (FIGS. 3 and 4) and is connected to hose 32A. Similarly, a second fluid outlet port 34 is mounted at end 16A and is connected to hose 34A.

A flow control element 36 is slidably mounted for longitudinal movement within the compartment 26. It is comprised of conical portion 38 which terminates at its outer end into cylindrical portion 38A, and conical portion 40 which terminates at its outer end to cylindrical portion 40A. The conical portions 38 and 40 are joined at center 42. The shape of control element 36 is symmetrical to the interior surface 28 of compartment 26. However, the flow control element 36 is of a decreased diameter to create spaces 44 and 46 between conical portions 38 and 40, respectively, and the interior surface 28 of compartment 26.

End cap 48 is secured to end 18A of housing part 18 and is secured thereto by bolts 48A. A stop bolt 48B extends longitudinally into end cap 48. Similarly, end cap 50 is secured by bolts 50A to end 16A of housing part 16. Stop bolt 50B extends into end cap 50 in a longitudinal direction. An elongated slot 52 exists in end cap 50, and a control link 54 is slidably mounted in slot 52 and is pivotally secured to the cylindrical portion 40A of control element 36.

A crawler tractor 56 (FIG. 1) has a drive system 58 and a hydraulic motor 58A on one side, and a drive system 60 and a hydraulic motor 60A on the other. Tractor 56 has a vehicle motor 62 operatively connected to hydraulic pump 64 which is connected in conventional fashion to oil reservoir 66. An oil return line 68 extends between the two hydraulic motors 58A and 60A, and oil reservoir 66.

The stop bolts 48B and 50B are set to engage the ends of cylindrical members 38A and 40A, respectively, to prevent the flow control element 36 from ever completely closing the fluid flow spaces 44 or 46.

In operation, the control link 54, which can be part of a conventional Saginaw steering mechanism or the like, is used to position the flow control element 36 within compartment 26. When ill the position shown in FIG. 3, more pressurized fluid will be diverted to outlet port 34 which will cause hydraulic motor 58A to function at a greater speed than motor 60A, whereupon the tractor 46 will turn to the right as viewed in FIG. 1. When control link 54 is used to move the control element 36 to a position opposite to that of FIG. 3, the tractor will turn in the opposite direction. When the control element 36 is centered in compartment 26 (FIG. 4), the vehicle will travel in a straight direction. This is because equal amounts of fluid will move to outlet ports 32 and 34, and hydraulic motors 58A and 60A will operate at the same speed.

Since the control element 36 can never "close" on the interior surface 28 of compartment 26, the device will never be "frozen" in a closed condition which would be very detrimental to the vehicle steering operation.

It is therefore seen that the invention will accomplish at least all of its stated objectives.

What is claimed is:

1. A flow control for fluid circuits having dual power outlets, comprising, a housing having an interior compartment, said compartment having an interior surface, a center portion, and first and second ends, said compartment having a maximum cross sectional area at its center portion uniformly decreasing in area towards said first and second ends, first and second outlet fluid ports in said housing adjacent said first and second ends thereof, a pressure fluid inlet port in said housing at said center portion, a flow control element mounted for longitudinal movement in said interior compartment and having an outer surface symmetrical in shape to that of said compartment, but having a smaller diameter wherein a fluid flow space exists between the outer surface of said control element and the interior surface of said compartment, control means for moving said control element longitudinally in said compartment to vary the size of the space between its exterior surface and the interior surface of said compartment at opposite sides of said center portion whereby the quantity of fluid flowing from said inlet port to said first and second outlet fluid ports can be simultaneously and proportionately increased and decreased, respectively.

2. The flow control of claim 1 wherein stop means are operatively secured to said housing for preventing the movement of said control element to close completely fluid flow from said inlet port to either first or second outlet fluid ports.

3. The flow control of claim 1 wherein said first and second outlet fluid ports are secured to hydraulic motors operatively connected to drive means on opposite sides of a ground vehicle.

* * * * *